United States Patent [19]
Yabe

[11] Patent Number: 5,594,662
[45] Date of Patent: Jan. 14, 1997

[54] DATA LINK CONTROL SYSTEM FOR MONITORING CONTROL

[75] Inventor: Toru Yabe, Kawasaki, Japan

[73] Assignee: Fujitsu Limited, Kanagawa, Japan

[21] Appl. No.: 296,490

[22] Filed: Aug. 25, 1994

[30] Foreign Application Priority Data

Mar. 16, 1994 [JP] Japan .................................. 6-072510

[51] Int. Cl.[6] ...................................................... G06F 13/00
[52] U.S. Cl. .................. 364/550; 364/514 C; 364/514 R; 364/132; 395/309; 395/311
[58] Field of Search ............................. 364/550, 138–140, 364/132, 514 C, 514 R; 395/325, 311, 312, 309; 340/825.08, 825.52, 825.5, 825.79, 825; 379/49, 102, 107, 28; 370/65, 60, 94.1

[56] References Cited

U.S. PATENT DOCUMENTS

| | | | |
|---|---|---|---|
| 5,107,489 | 4/1992 | Brown et al. | 340/825.79 |
| 5,206,933 | 4/1993 | Farrell et al. | 395/325 |
| 5,329,431 | 7/1994 | Taylor et al. | 364/132 |
| 5,432,910 | 7/1995 | Barker et al. | 395/325 |

*Primary Examiner*—Emanuel T. Voeltz
*Assistant Examiner*—Hal D. Wachsman

[57] ABSTRACT

A control system includes data links for monitoring control of a transmission device from a maintenance device by polling, to make it easier to change the setting of the data link connection. The system has a plurality of transmission devices constituting a network and one maintenance device, for monitoring each of transmission devices from the maintenance device with a polling system. The system has a data link connecting section, a maintenance device interface section located between the maintenance device and the data link connecting section, a transmission device monitoring control section and a common processing section. The connection in the data link connecting section is set according to each item of the basic connecting information table.

14 Claims, 16 Drawing Sheets

| | | |
|---|---|---|
| 20 | LTE | (NE TYPE) |
| 21 | 1 | (Station Address) |
| 22 | E2A | (Monitoring control classification) |
| 23 | NO | (Information indicating whether data link 1 is used or not) |
| 24 | NO | (Information indicating whether data link 2 is used or not) |

| LTE | ~20 |
| 1 | ~21 |
| E2A | ~22 |
| YES | ~23 |
| NO | ~24 |

| Liner | ~20 |
| 2 | ~21 |
| GP1 | ~22 |
| YES | ~23 |
| YES | ~24 |

| LTE | ~20 |
| 3 | ~21 |
| GP2 | ~22 |
| NO | ~23 |
| YES | ~24 |

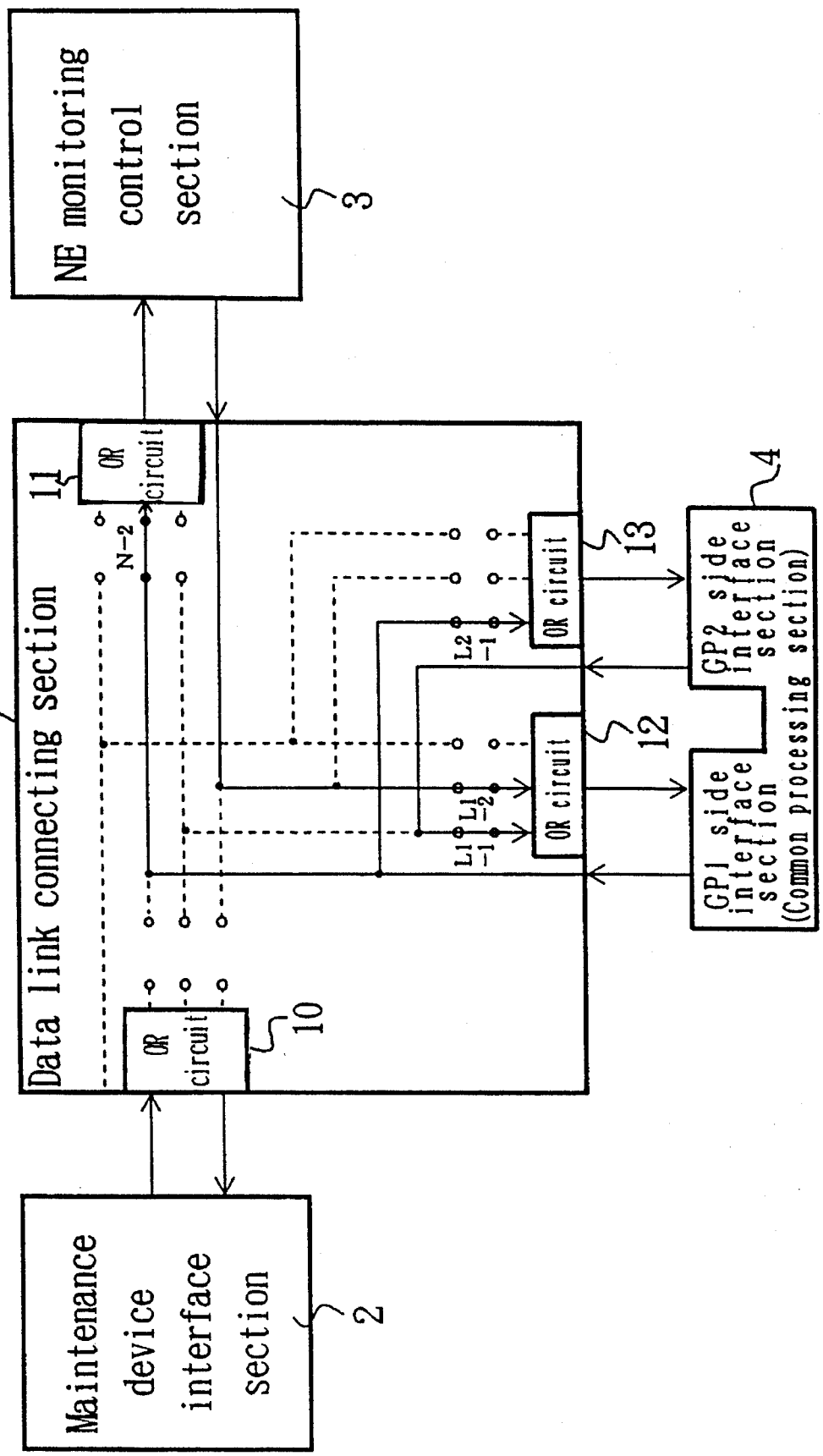

| LTE | ~20 |
|---|---|
| 1 | ~21 |
| GP1 | ~22 |
| YES | ~23 |
| NO | ~24 |

| Liner | ~20 |
|---|---|
| 2 | ~21 |
| E2A | ~22 |
| YES | ~23 |
| YES | ~24 |

| LTE | ~20 |
|---|---|
| 3 | ~21 |
| GP2 | ~22 |
| NO | ~23 |
| YES | ~24 |

| Ring | ~20 |
|---|---|
| 1 | ~21 |
| E2A | ~22 |
| YES | ~23 |
| YES | ~24 |

| Ring | ~20 |
|---|---|
| 2 | ~21 |
| GP1 | ~22 |
| YES | ~23 |
| YES | ~24 |

| Ring | ~20 |
|---|---|
| 3 | ~21 |
| GP2 | ~22 |
| YES | ~23 |
| YES | ~24 |

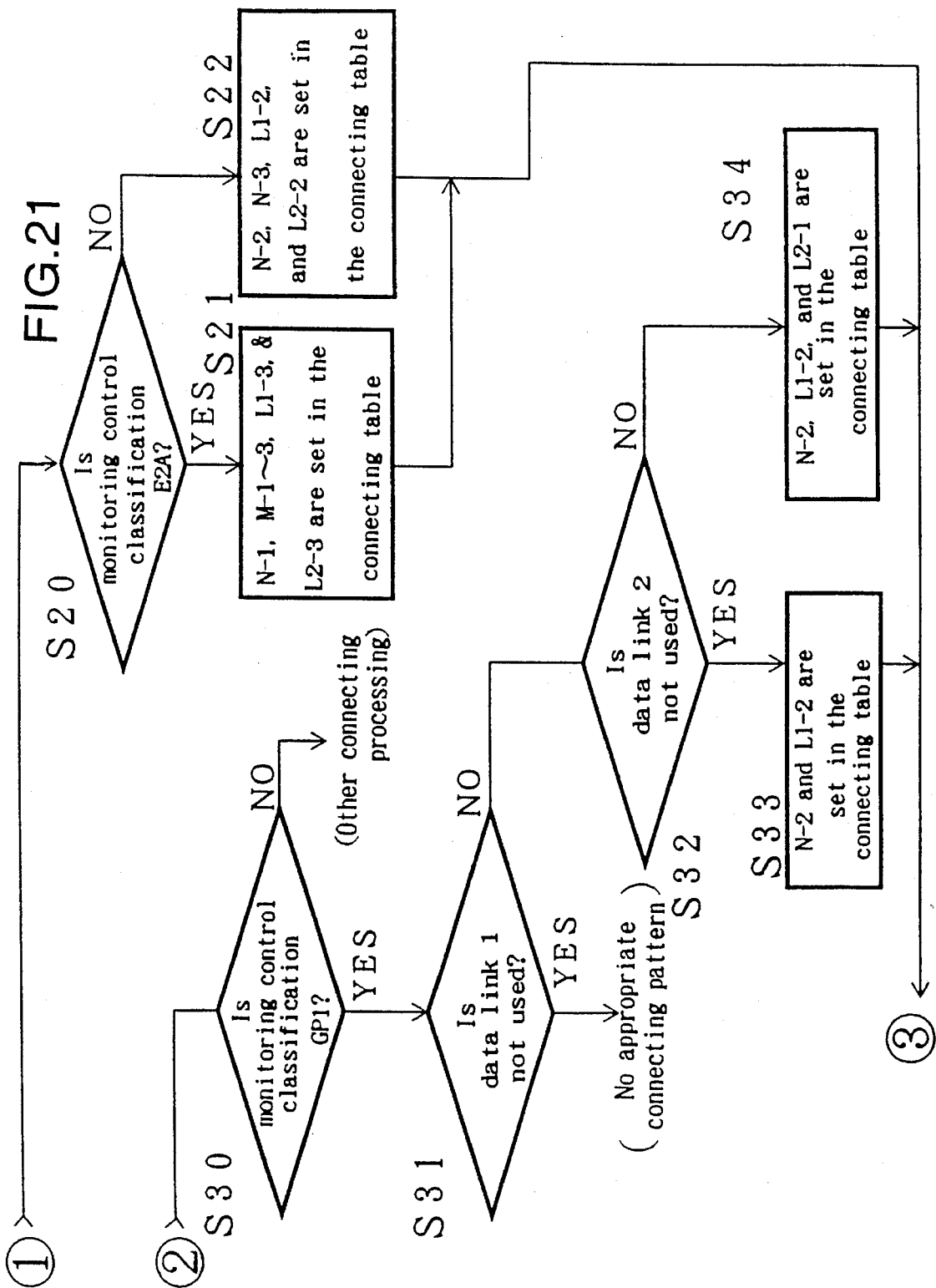

DATA LINK CONTROL SYSTEM FOR MONITORING CONTROL

BACKGROUND OF THE INVENTION

1. Field of the Invention

The present invention relates to a data link control system for monitoring control. More particularly, it relates to a control system, by which a data link in constructed for performing to monitor and control each transmission device (NE-Network Element) composing a network by polling from one maintenance center.

2. Description of the Related Art

In the case where the monitoring and controlling of transmission device is performed by existing maintenance device, according to a recent demand of diversification or high performance of a network, it is also required to support protocol with the existing maintenance device on the transmission device side to satisfy requests on a new network or new maintenance system formed between the transmission device and the existing maintenance device.

Transmission device having new interface functions is further required, for the new maintenance system. Therefore, each transmission device should be set according to the maintenance device, to operate the interface functions.

It was constituted with a simple network, in the case where the conventional transmission device was controlled for monitoring by the existing maintenance device (for example, it was constituted with Point-to-Point structure in which two terminals were composed), so that a maintenance operator sets a system according to the use of the system by installing switches for setting a station address, information for monitoring and controlling information for indicating whether each data link should be used or not and the like.

However, according to diversification or high performance of a network, switch settings as described above are increased depending on the increase of requests for hardware.

Accordingly, a number of switch settings should not only be performed to connect data links according to a new network in the transmission device, but it is also required to ascend the integrated rate, because there is a big problem for mounting to realize the hardware filled with a various kinds of functions.

Further, malfunction of the operator causes the case where the system does not work correctly, when a number of switch settings are performed.

SUMMARY OF THE INVENTION

It is therefore an object of the present invention to provide a data link control system, which has a data link connecting function controllable to a maintenance interface section of the transmission device, so as to be able to change the settings of the data link with a simple operation, without a number of switch settings, for the diversified new network.

A data link control system having a plurality of transmission devices constituting a network, and one maintenance device, which monitors the plurality of the transmission device with a polling system, according to the present invention, may comprise:

A data link connecting section; a maintenance device interface section located between the maintenance device and the data link connection section; a transmission device monitoring control section; and a common processing section, connections in the data link connecting section being formed according to each item on a basic connecting Information table.

BRIEF DESCRIPTION OF THE DRAWINGS

FIG. 12 is a diagram explaining the example of the data link connection of B station in the third embodiment.

FIG. 21 is an operation flow (No. 2) for connecting the data link according to the present invention.

DETAILED DESCRIPTION OF THE PREFERRED EMBODIMENTS

The fundamental concept of the present invention will be first explained for the better understand of the invention, before the preferred embodiment of the present invention will be explained in accordance with the attached drawings.

Figure 1:
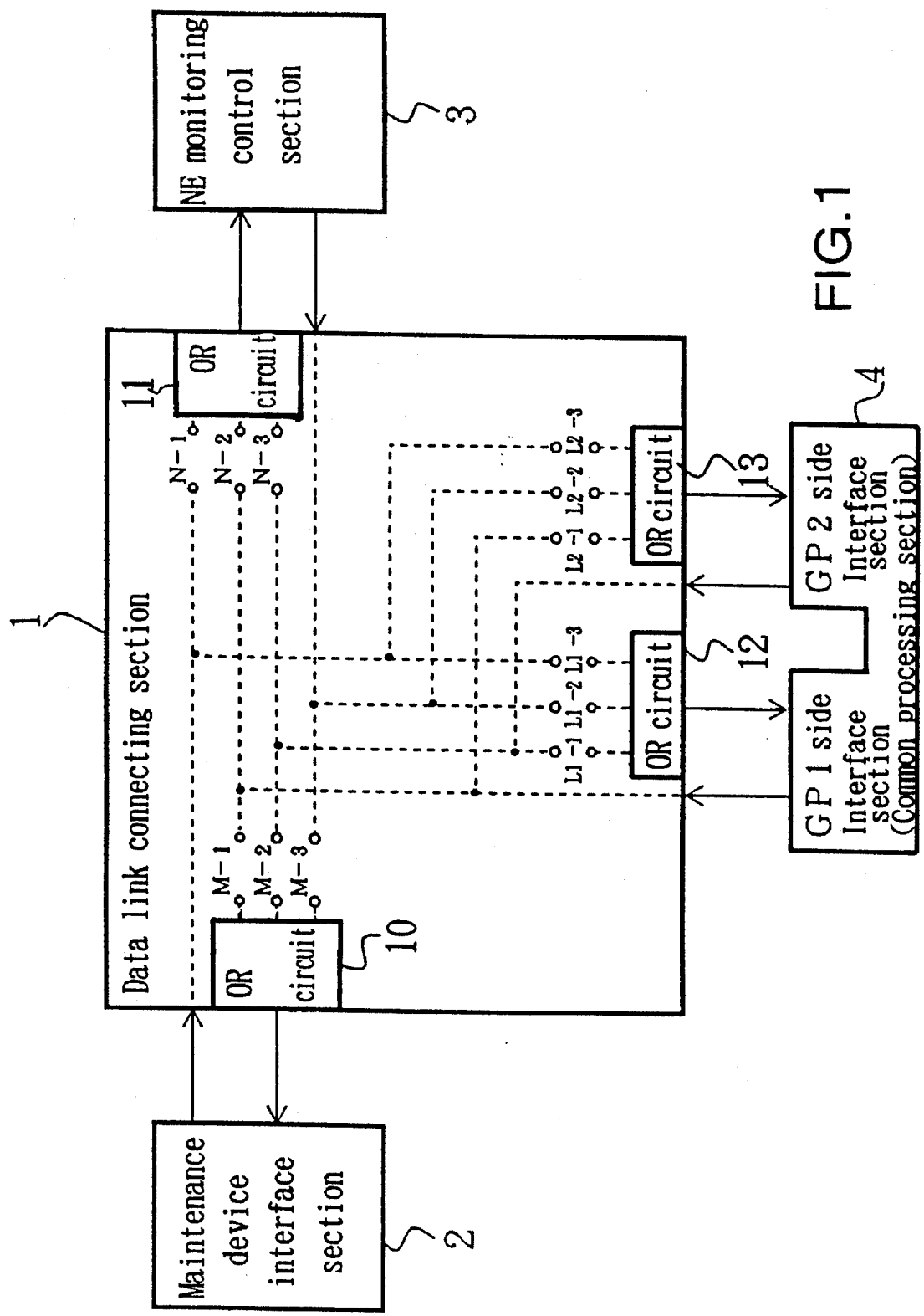
FIG. 1 is a block diagram showing a principle of the present invention.

FIG. 1 is a diagram explaining a fundamental structure of a data link connection section 1, a maintenance device interface 2, a transmission device (NE) monitoring control section 3, and a common processing section 4, which are all provided in transmission device according to the present invention.

In FIG. 1, the data link connecting section 1 makes connections between monitoring control data links, the transmission device itself and maintenance device according to the use of the transmission device.

The maintenance device interface section 2 has an interface function for connecting the maintenance device, not shown in the diagram, to the data link connection section 1 via an optical transmission path and performs physical and electrical conversions between the maintenance device and the data link connection section 1.

The NE monitoring control section 3 performs a fault monitoring and a maintenance control and the like for the optical transmission path and the transmision device itself. The common processing section 4 performs to interface with two optical transmission paths and includes individual interface sections on the sides of data link 1 (GP1) and data link 2 (GP2) of the optical transmission paths and a common section, which processes an overhead byte (data link) of the optical transmission paths.

The data link connecting section 1 has OR gate circuits 10 through 13, and the outputs of the OR gate circuits are inputted to the maintenance device interface section 2, the NE monitoring-control section 3, and the interface section for the data link 1 (GP1) and the data link 2 (GP2) in the common processing section 4, respectively.

The OR gate circuits 10 through 13, which have three inputs, respectively, are connected to each of the switch contact points M-1 through M-3, N-1 through N-3, Li-1 through L1-3, and L2-1 through L2-3. Further, the inputs are connected to the switch contact points M-1 through M-3 of the OR gate circuit 10 from the NE monitoring control section 3 and the interface sections for the data link 1 (GP1) and the data link 2 (GP2) in the common processing section 4.

Further, the inputs are connected from the NE monitoring control section 3 and the interface sections for the data link 1 (GP1) and the data link 2 (GP2) in the common procesing section 4 to the switch contact points M-1 through M-3 of the OR gate circuit 10.

And the inputs from the maintenance device interface section 2 and the interface sections for the data link 1 (GP1) and the data link 2 (GP2) in the common processing section 4 are connected to the switch contact points N-1 through N-3 of the OR gate circuit 11.

Furthermore, the inputs from the maintenance device interface section 2, and the interface sections for the NE monitoring control section 3 and the data link 2 (GP2) in the common processing section 4 to the switch contact points Li-1 through L1-3 of the OR gate circuit 12.

On the other hand, the inputs from the maintenance device interface section 2, and the interface sections for the NE monitoring control section 3 and the data link 1 (GP1) in the common processing section 4 are connected to the switch contact points L2-1 through L2-3 of the OR gate circuit 13.

Further, informations required for connecting the data link according to the use of the system are set to the maintenance device by the maintenance operator. Thus, the connection of each of switch contact points M-1 through M-3, N-1 through N-3, LI-1 through L1-3 and L2-1 through L2-3 is constituted so as to be selected according to the use of the system.

Figure 2:
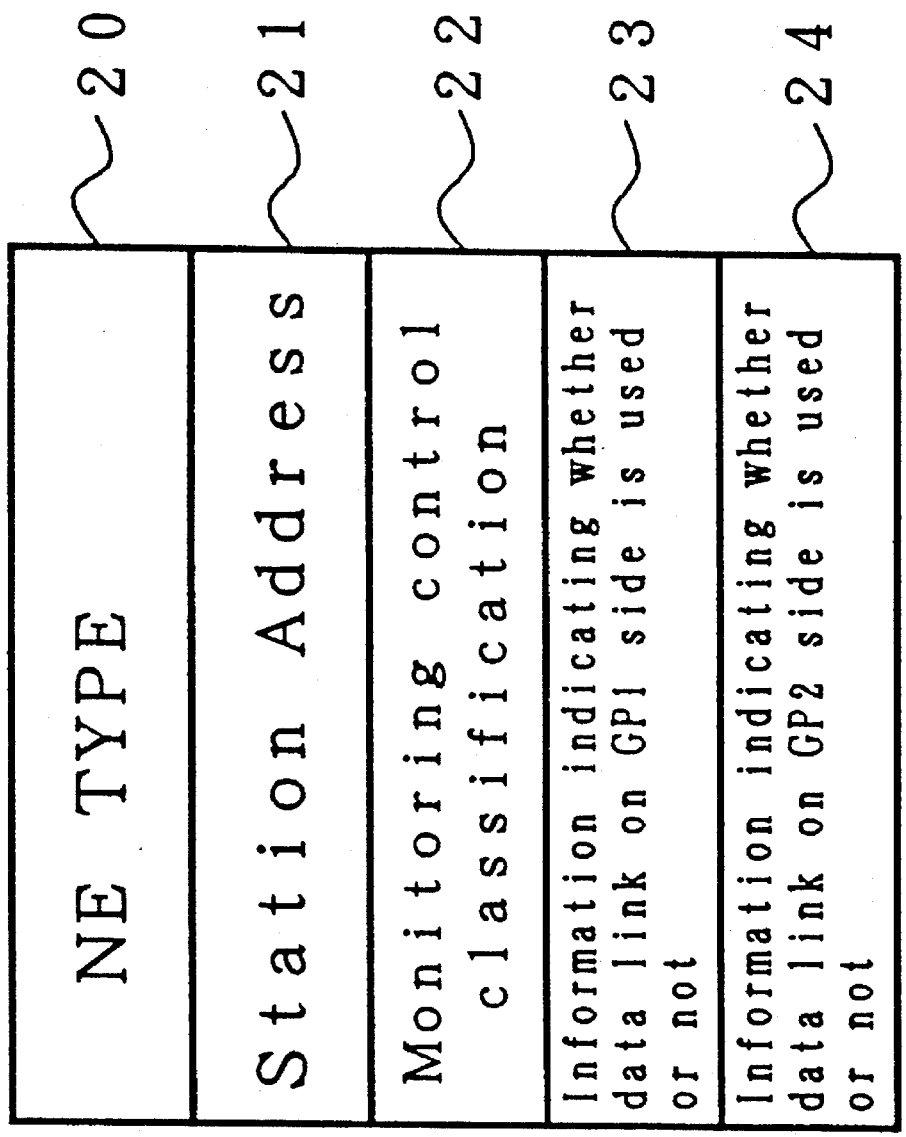
FIG. 2 is an explanatory diagram of a basic connecting information table.

That is, FIG. 2 is an explanatory diagram of the basic connecting information table on which the required informations are recorded. In the diagram, reference numeral "20" shows the type of the transmission device (NE TYPE) indicating in what kind of network it is built-in.

Reference numeral "21" shows a station address for identifying the transmission device, which is set according to a polling system from the maintenance device. Numeral "22" shows classification of the monitoring control indicating how the transmission device which is controlled for monitoring is related to the maintenance device or the maintenance device via a data link.

Numeral "23" shows an information indicating whether the maintenance device controls for monitoring via the data link on the GP1 side or not. Numeral "24" shows an information indicating whether the maintenance device controls for monitoring via the data link on the GP2 side or not.

Further, each of items indicated on this basic connection information table is stored in a non-volatile memory, so that it is possible to restore the state of the use to the original operating state (the state where the data link was connected) from the non-volatile memory, immediately, when an obstacle is restored, even if the obstacle of power disconnection or the like occurs.

The present invention is constituted so as to set switches for indicating station address, monitoring of control information, and an information whether the data link is used or not, and further switches for indicating NE TYPE corresponding to the new network on the table, that is, store them on a memory.

Therefore, it becomes possible to remove switch contact points operated for setting so often by the maintenance operators from the data link connecting section 1.

In the case where the maintenance operators change the settings according to the operation of the new network, they can change easily by inputting the desired items from the maintenance console to the basic connection information table of the memory.

Figures 3, 4:
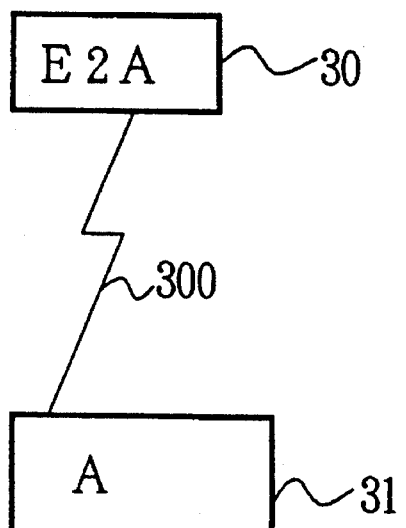
FIG. 3 is an explanatory diagram of a first embodiment of the present invention.
FIG. 4 is a diagram explaining a basic connecting information table of A station in the first embodiment.

FIG. 3 is a first embodiment of the present invention, in which a maintenance device (E2A) 30 monitors and controls an A station 31, which is individual transmission device.

In this embodiment, the operation state (items on the basic conecting information table) set by the maintenance operator is as shown in FIG. 4. That is, the NE TYPE 20 is LTE (terminal device), which has the same station setting as a point-to-point structure, and a station address 21 becomes 1, because it is only the transmission device 31, which is monitored.

Further, the monitoring control classification table is set as a maintenance device (E2A), as the transmission device 31 is directly controlled for monitoring. Both the informations indicating whether the data link 1 is used or not, and the informations indicating whether the data link 2 is used or not, are classified as NO.

Figure 5:
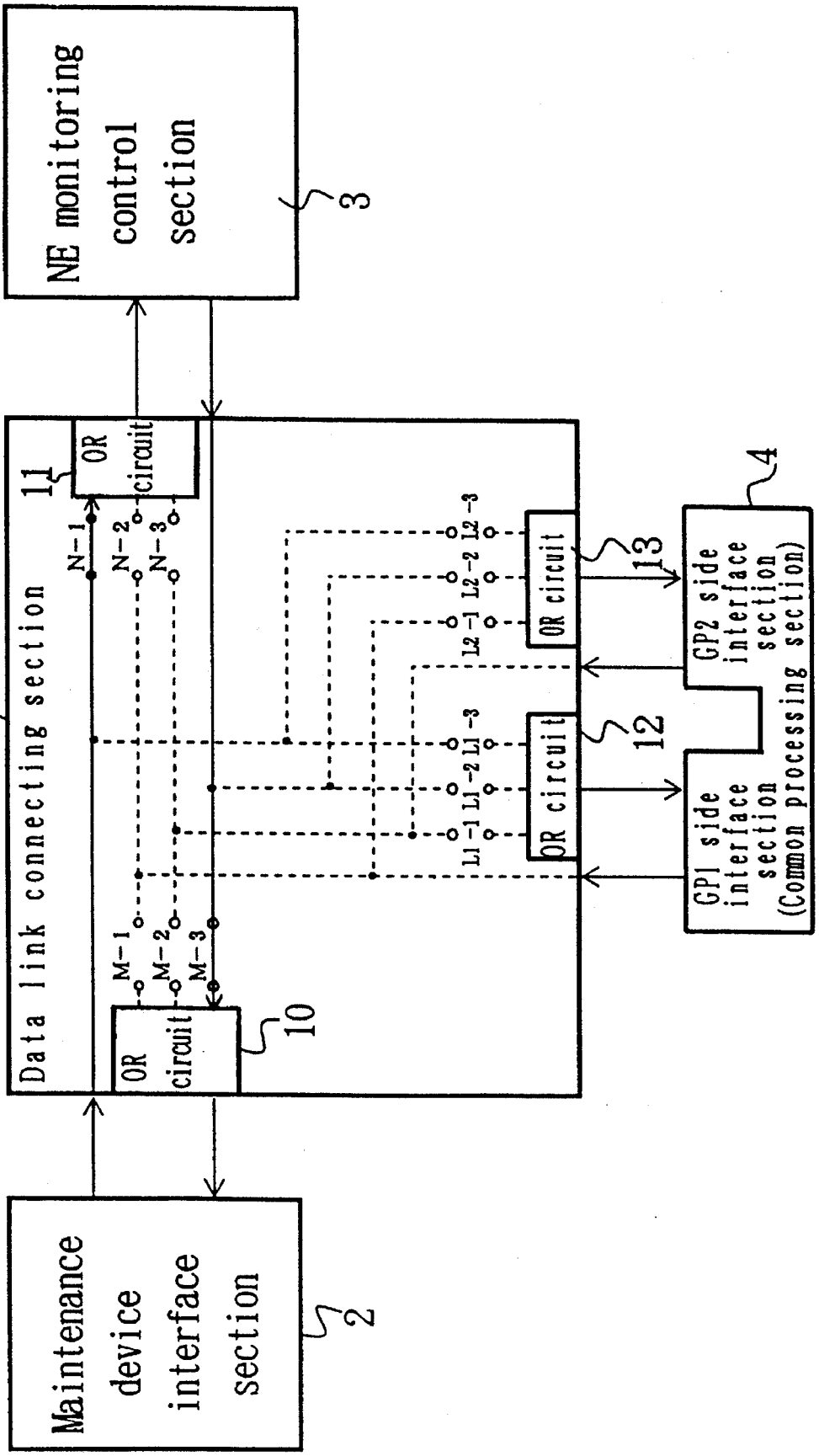
FIG. 5 is a diagram explaining an example of the data link connection in the first embodiment.

FIG. 5 shows a connecting structure of the data link connecting section 1 constituted as corresponding to the basic connecting information shown in FIG. 3. In here, the switch contact point N-1 is connected so as that the output from the maintenance device interface section 2 is connected to the NE monitoring control section 3, via the OR gate circuit 11.

Further, in opposite to that, the switch contact point M-3 is connected so as that the output from the NE monitoring control section 3 is connected to the maintenance device interface section 2, via the OR gate circuit 10.

Figure 6:
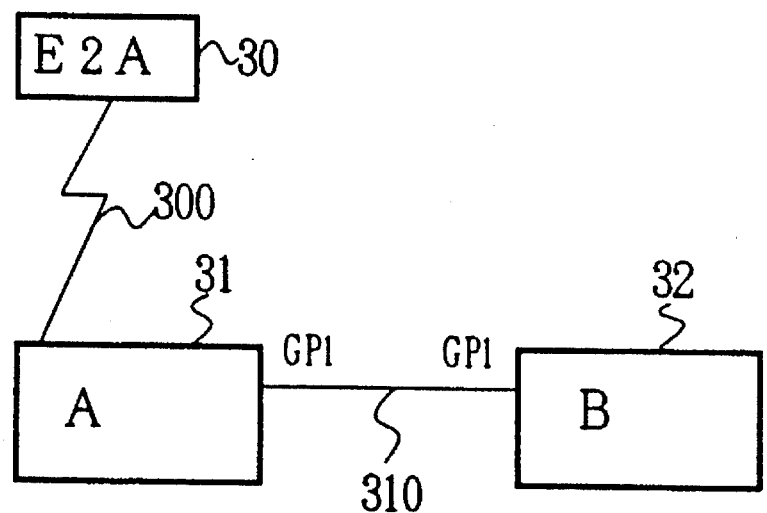
FIG. 6 is a diagram explaining a second embodiment according to the present invention.

FIG. 6 shows a second embodiment of the present invention, in which the maintenance device 30 controls for monitoring the A station and the B station with a Point-to Point structure. The optical transmission path 310 connects between the A station 31 and the B station 32, which are transmission devices. Both stations monitor the optical transmission path 310 on the side of data link 1 (GP1), respectively.

Figures 7A, 7B:
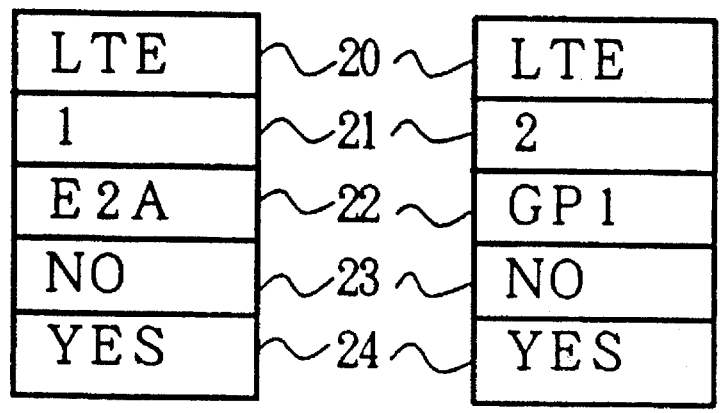
FIG. 7A and FIG. 7B are diagrams explaining the basic connecting information tables of each station in the second embodiment.

Although the items on the basic connecting information table of the A station 31 are indicated in FIG. 7A and are almost same as that of the first example shown in FIG. 4, the information indicating whether the data link 1 is used or not is classified as NO, because the optical transmission path 310 is monitored on the side of the data link 1 (GP1).

In opposite to that, in the items shown in FIG. 7B of the basic connecting information for the B station 32, the station address for identifying the station is classified as 2, and the monitoring control classification table 22 is classified as GP1, as the B station is controlled for monitoring, via the optical data link on the side of the data link 1 (GP1).

Figure 8:
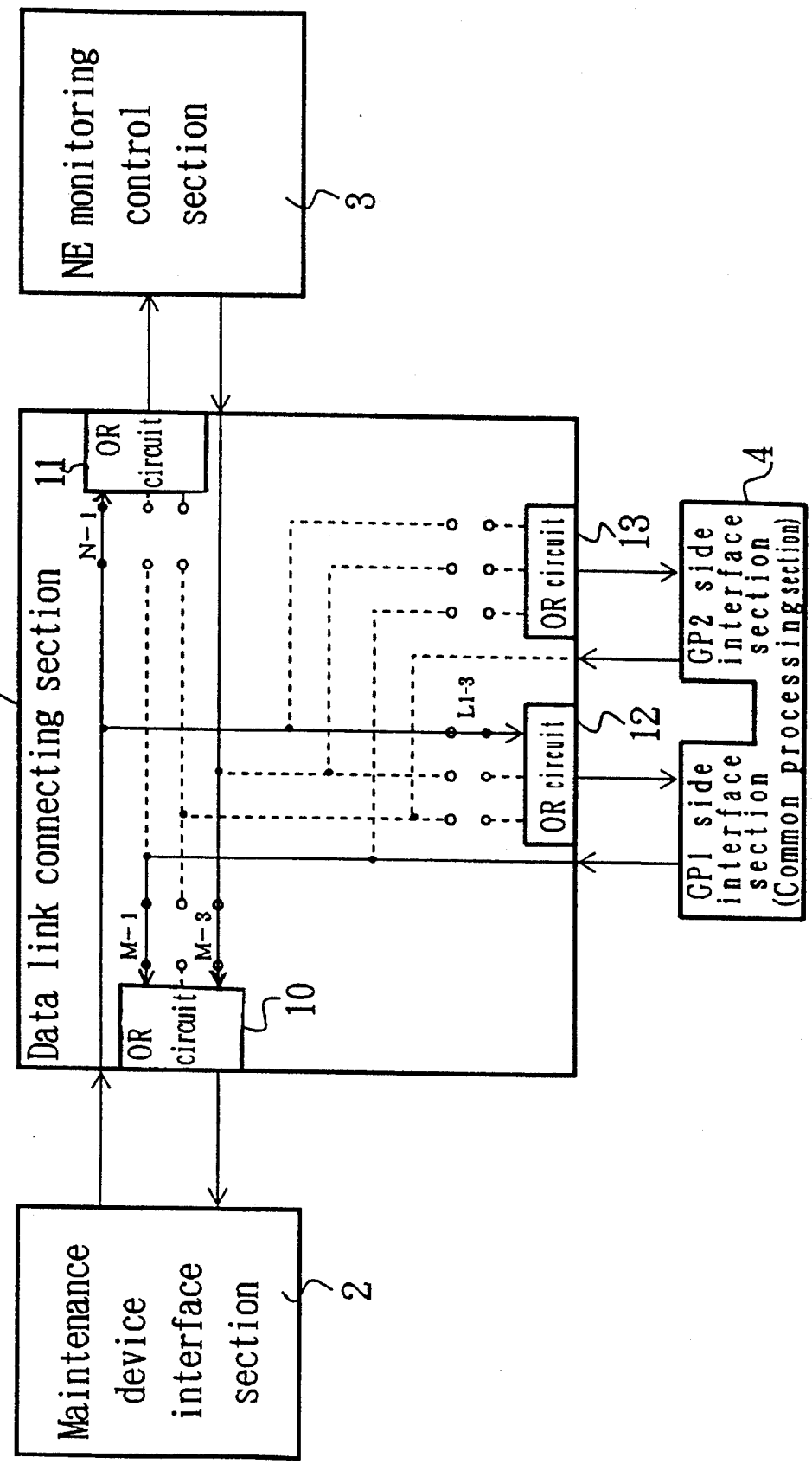
FIG. 8 is a diagram explaining the example of the data link connection of A station in the second embodiment.
Figure 9:
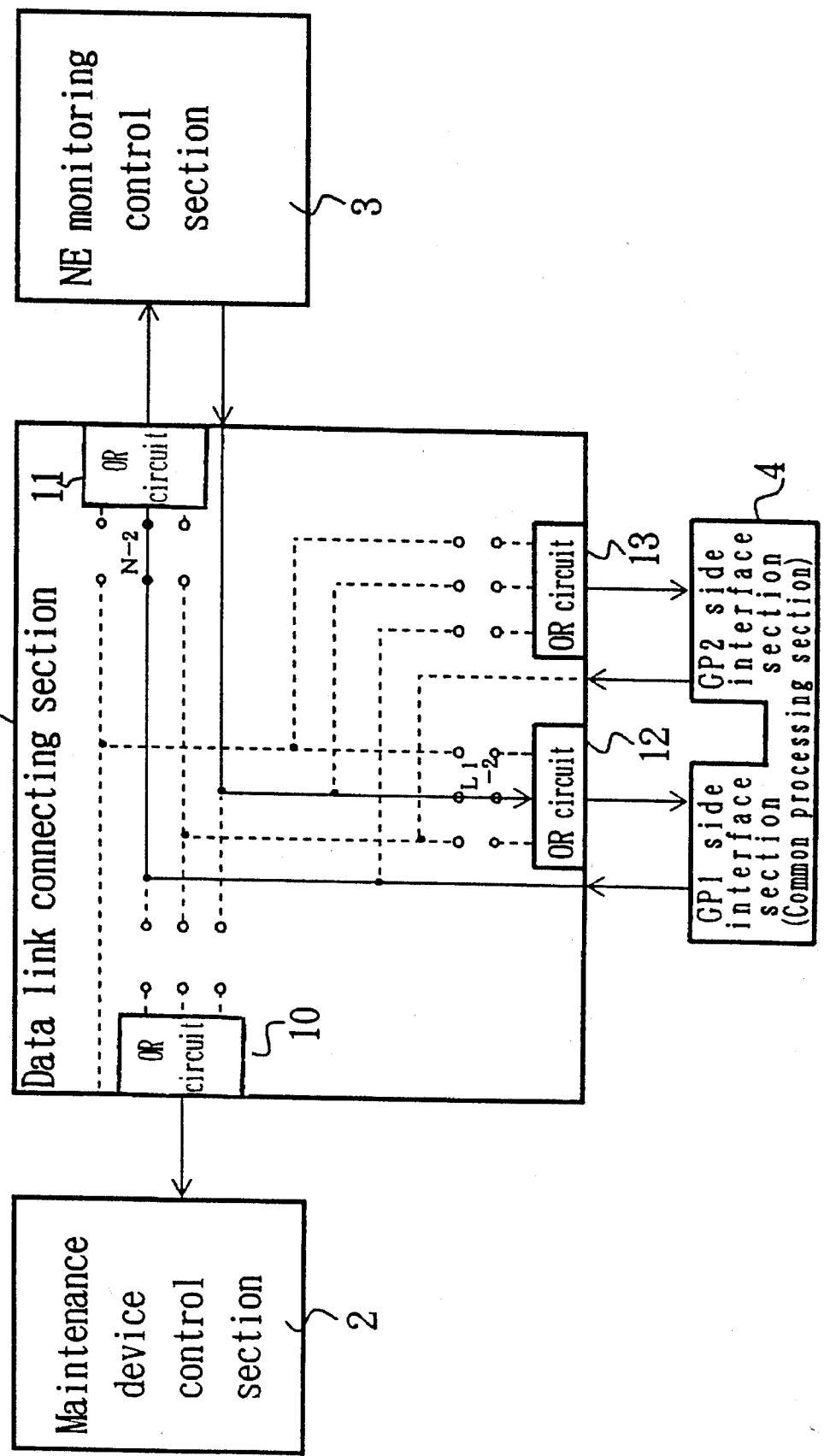
FIG. 9 is a diagram explaining the example of the data link connection of B station in the second embodiment.

FIGS. 8 and 9 show the connecting structures of the data link connecting sections 1 of each the A station 31 and the B station 32, which are constituted according to the items shown in FIGS. 7A and 7B of the basic connecting information table, corresponding to the embodiment performed with the Point-to-Point structure shown in FIG. 6, respectively.

The switch contact points M-1 and M-3 are connected on the data link connecting section 1 of the A station 31 shown in FIG. 8, and the output of the NE monitoring control section 3 is connected to the OR gate circuit 10, so as to reply the response of the A station 31 via the switch contact point M-1.

Then, the monitoring signal is sent from the maintenance device to each of the transmission device with the polling system, so that the response is sent from only the transmission device signified in polling to the OR gate circuit 10.

FIG. 9 shows the connecting structure of the data link connecting section 1 of the B station 32. The interface section on the side of GP1 of the data link connecting section 1 of the A station 31 shown in FIG. 8 and the interface section on the side of GP1 of the data link connecting section 1 of the B station 32 shown in FIG. 9 are connected via the optical transmission path 310, as described above.

Accordingly, the switch contact point L1-2 is connected and therefore, the output from the NE monitoring control section of the B station 32 is inputted via the OR gate circuit 12 to the interface section on the side of GP1 of the data link connecting section 1 of the A station 31 shown in FIG. 8.

And the output is sent from the interface section on the side of GP1 to the maintenance device via the maintenance interface section 2, through the switch contact point M-1 and the OR gate circuit 10 in the A station 32.

On the other hand, the switch contact point L1-3 is connected to the output from the data link connecting section 1 of the A station 31, via the OR gate circuit 12, to the interface section on the side of GP1 of the data link connecting section 1 of the B station 32 shown in FIG. 9. Further, the switch contact point N-2 is connected, so that the output from the A station 31 is inputted to the NE monitoring control section 3 of the B station 32 via the switch contact point N-2.

Figures 10, 11A, 11B, 11C:
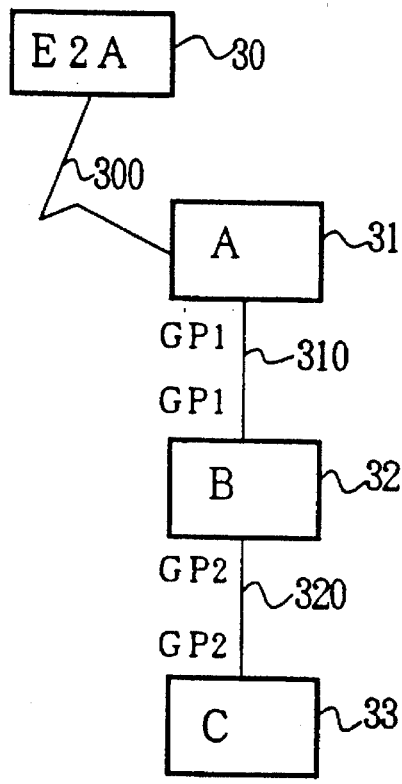
FIG. 10 is a diagram explaining a third embodiment according to the present invention.
FIG. 11A through FIG. 11C are diagrams explaining the basic connecting information tables of each station in the third embodiment.

FIG. 10 shows a third embodiment of the present invention, in which the maintenance device 30 controls for monitoring the A, B and C stations, with a liner structure. The A station is connected to B station 32 via the optical transmission path 310 on the side of GP1. And further, the B station 32 is connected to the C station 33 via the optical transmission path 320 on the side of GP2.

The items on the basic connecting information table of the A station 31 are as shown in FIG. 11A. The connecting structure is as same as that of FIG. 6, so that the items on the basic connecting information table are same as those as shown in FIG. 7A.

In the items on the basic connecting information table of the B station 32 (FIG. 11B), the NE TYPE 20 is classified as Liner, because the station 32 has a repeater function in the liner structure. The information indicating whether the data link 1 is used or not is classified as YES, as the monitoring control classification 22 is classified as GP1, because the B station 32 is controlled for monitoring via the optical data link on the side of GP1. Further, the B station is connected to the C station 33, via the optical data link on the side of GP2, so that the information indicating whether the GP2 is used or not is also classified as YES.

In the items on the basic connecting information table of the C station 33 (FIG. 11C), the monitoring control classification 22 is classified as GP2, as the C station 33 is monitored via the optical data link on the side of GP2. The information indicating whether the data link 1 is used or not is classified as NO, and the information indicating whether the data link 2 is used or not is classified as YES.

FIG. 12 shows the connecting structure of the B station 32 in the third embodiment shown in FIG. 10. This connection is constituted by judging the items of the basic connecting information table, so as that a command can be sent and received from the GP1 side to GP2 side, and a response can be sent and received from the GP2 side to GP1 side. That is, the switch contact point N-2 is connected to the OR gate circuit 11, the switch contact points LI-1 and L1-2 are connected to the OR gate circuit 12, and the switch contact point L2-1 is connected to the OR gate 13.

Figures 13, 14A, 14B, 14C:
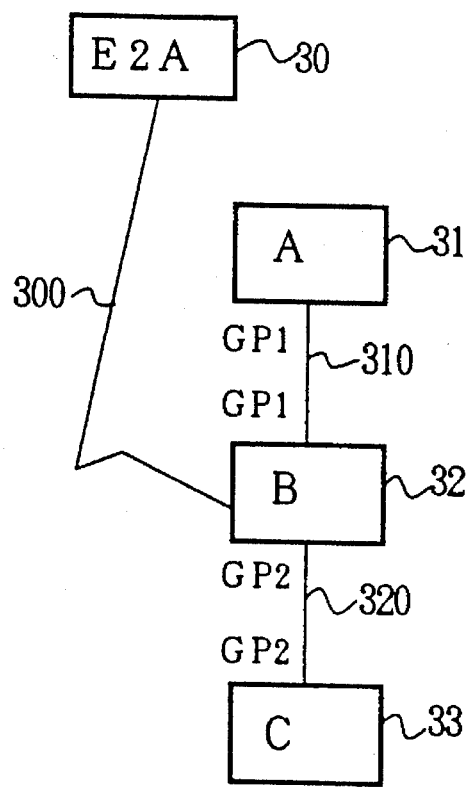
FIG. 13 is a diagram explaining a fourth embodiment according to the present invention.
FIG. 14A through FIG. 14C are diagrams explaining the basic connecting information tables of each station, in the fourth embodiment.

FIG. 13 shows a fourth embodiment, in which the maintenance device 30 controls for monitoring the repeater station with Liner structure. Only one information of the monitoring control classification 22 is different, in the items on the basic connecting information tables indicated in FIGS. 14A, 14B and 14C, respectively, of the A station 31, the B station 32, and the C station 33, in comparison with those of the embodiment shown in FIG. 10.

That is, the A station 31 is controlled for monitoring from the side of GP1, so that the monitoring control classification 22 is classified as GP1, as shown in FIG. 14A. The B station 32 is monitored by the maintenance device (E2A) 30, directly, so that the monitoring control classification 22 is classified as E2A.

Figure 15:
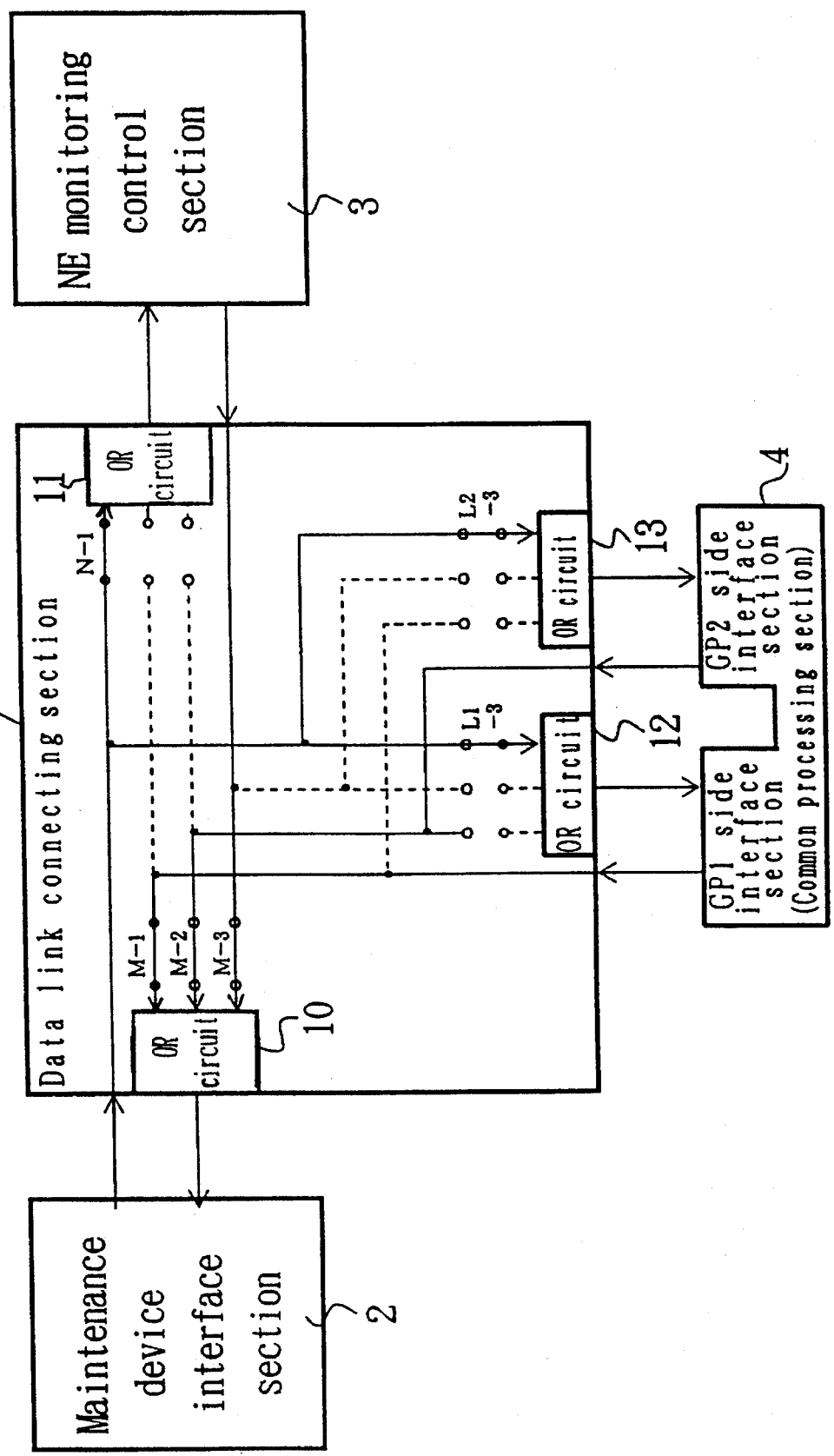
FIG. 15 is a diagram explaining the example of the data link connection of B station in the fourth embodiment.

Further, The C station 33 is controlled for monitoring from the side of GP2, so that the monitoring control classification 22 is classified as GP2, as shown in FIG. 14C. FIG. 15 shows the connecting structure of the B station for controlling for monitoring the repeater station, with the Liner structure. This connection is constituted by judging the items on the basic connecting information table as shown in FIG. 14B, so as a the command can be sent and received from E2A to GP1/GP2, and a response can be sent and received from GP1/GP2 to E2A.

Accordingly, the switch contact points M-1 through M-3 of the OR gate circuit 10, the switch contact point N-1 of the OR gate circuit 11, the switch contact point L1-3 of the OR gate circuit 12, and the switch contact point L2-3 of the OR gate circuit 13 are connected.

Figures 16, 17A, 17B, 17C:
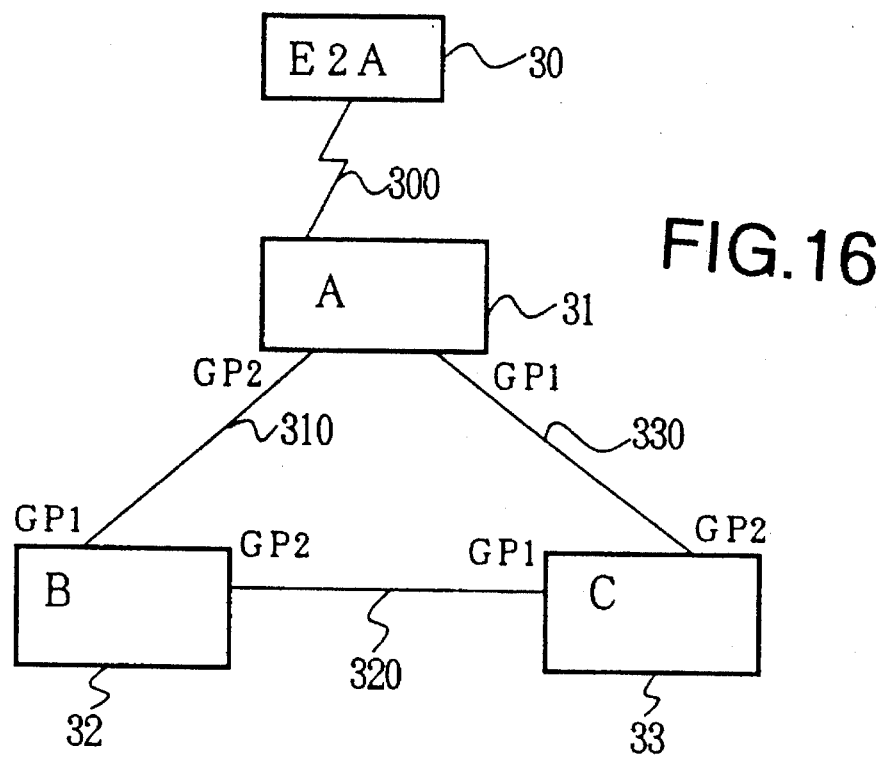
FIG. 16 is a diagram explaining a fifth embodiment according to the present invention.
FIG. 17A through FIG. 17C are diagrams explaining the basic connecting information tables of each station in the fifth embodiment.

FIG. 16 shows a fifth embodiment of the present invention, in which the maintenance device 30 controls for monitoring the repeater station with the Ring structure. That is, the A station 31, B station 32, and C station 33 are connected via the optical transmission paths 310, 320 and 330, in a circle.

In the items on the basic connecting information table of each station, as shown in FIGS. 17A through 17C, all informations indicating the NE TYPE 20 are classified as Ring, and only one information indicating the monitoring control classification 22 of the A station 31 is classified as the maintenance device (E2A) 30, and other informations indicating the monitoring control classification 22 of the B station 32 and the C station 33 can be classified as either GP1 or GP2.

Figure 18:
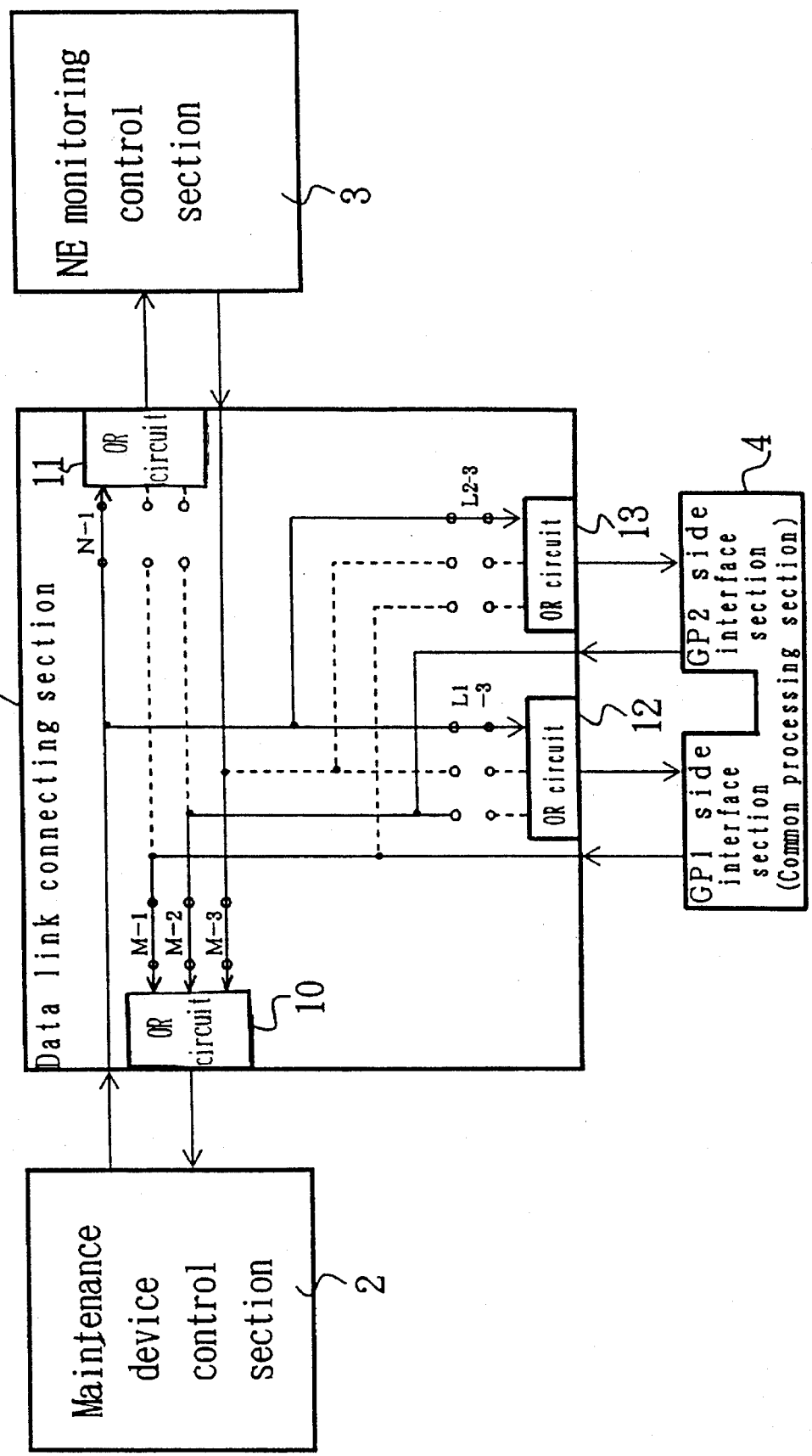
FIG. 18 is a diagram explaining the example of the data link connection of A station in the fifth embodiment.

FIG. 18 is a diagram showing the connecting structure of the data link section 1 for the A station 31 controlled for monitoring with the Ring structure of the fifth embodiment. The connecting state is same as that shown in FIG. 15, entirely.

However, the response from the GP1/GP2 to the maintenance device (E2A) 30 allows the receipt data to flow to either of the GP1 or GP2 interface section of the common processing section 4, in the case of the Ring structure.

Figure 19:
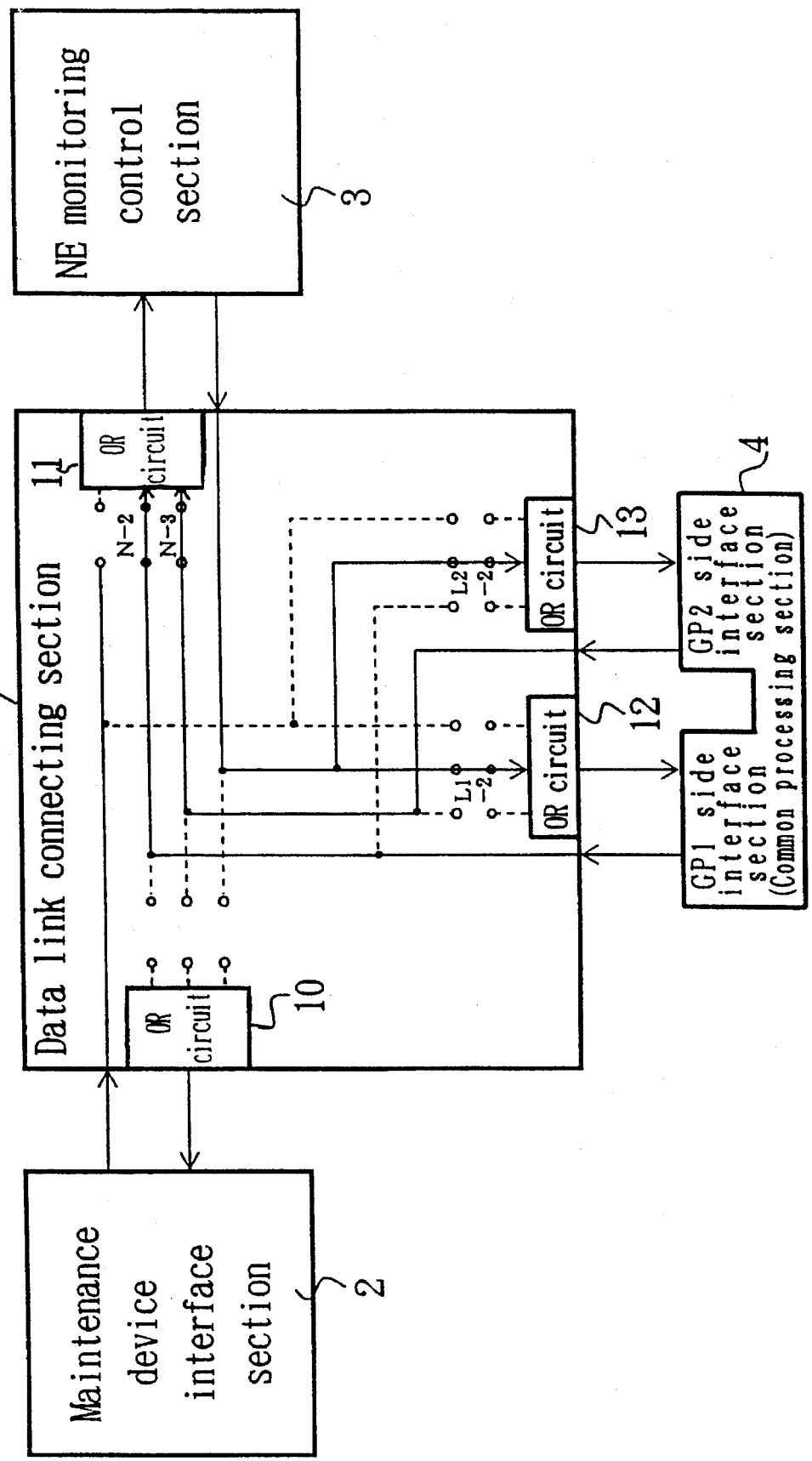
FIG. 19 is a diagram explaining the example of the data link connection of B or C station in the fifth embodiment.

FIG. 19 shows the connecting structure of the B station 32/ the C station 33 controlled for monitoring with the Ring structure of the fifth embodiment. This connection is constituted by judging the items of the basic connecting information table (FIGS. 17A through 17C), so as that the command can be sent and received from GP1/GP2 to the transmission device (NE), and the response can be sent and received from the transmission device (NE) to the GP1/GP2. However, in the case of ring structure, the command of the maintenance device (E2A) 30 sent from the GP1/GP2 allows the sending data in the common processing in the GP1/GP2 interface section to flow to either GP1 or GP2.

Therefore, the switch contact points N-2 and N-3 of the OR gate circuit 11, the switch contact point L1-2 of the OR gate circuit 12, and the switch contact point L2-2 of the OR gate circuit 13 are connected.

Figure 20:
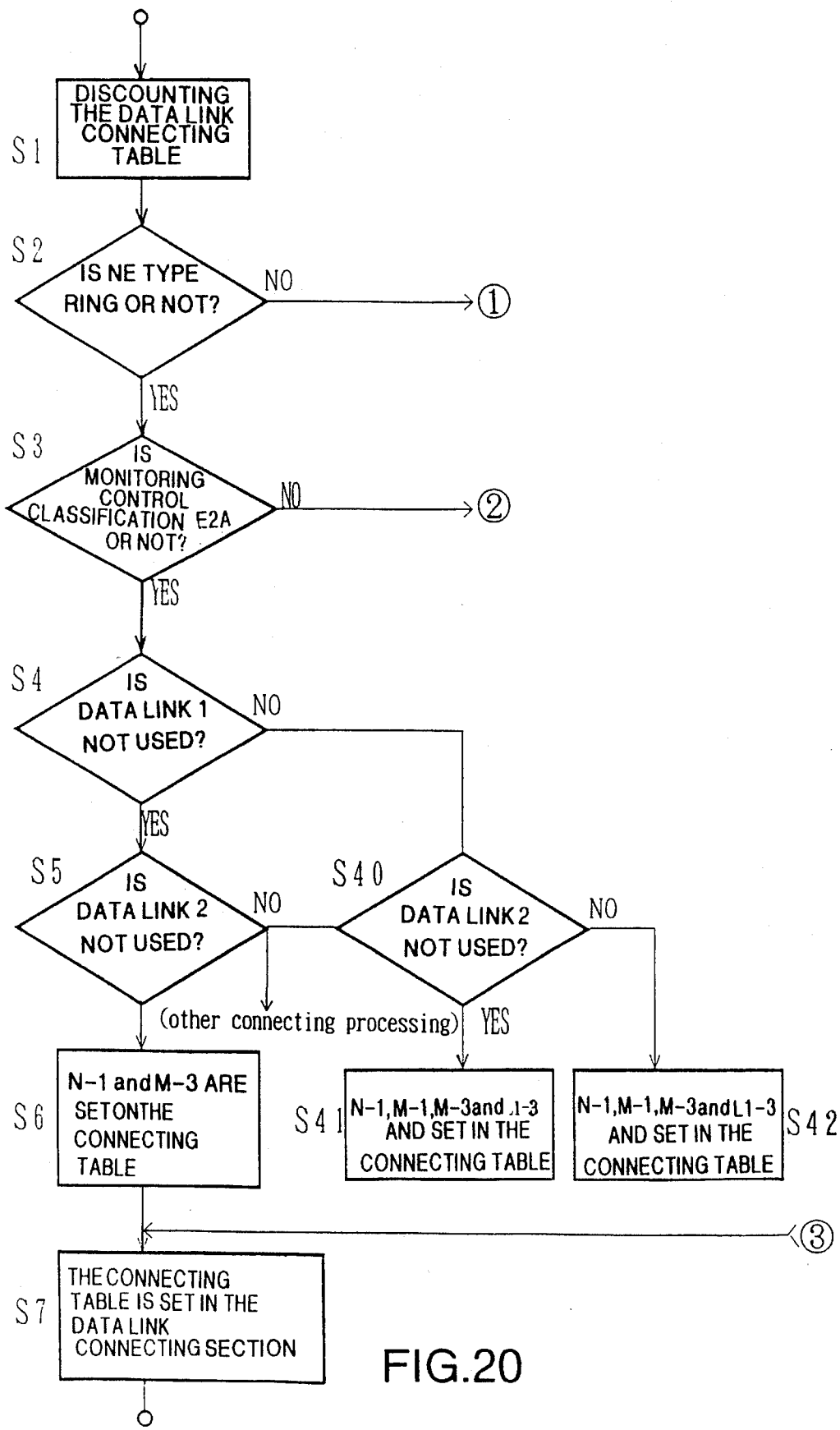
FIG. 20 is an operation flow (No. 1) for connecting the data link according to the present invention.

FIGS. 20 and 21 are flow charts showing the data link connection according to the present invention. Those are, the operation flows in which the data link connecting table is provided in the memory, the items on the basic connecting information table are judged after initializing, the data link connecting table is created and the connecting structure of the data link connecting section 1 is set.

At first, the data link connecting section 1 is set as the state disconnected (STEP S1) in FIG. 20. And next, the information indicating the NE TYPE 20 selected from the items on the basic connecting information table is judged whether the type is a ring structure or not (STEP S2).

When it is not the ring structure (YES), the information indicating the monitoring control classification 22 is judged whether it is classified as the maintenance device (E2A) 30, or not (STEP S3). If it is classified as the maintenance device (E2A) 30, it is judged whether the data link 1 is used or not (STEP S4).

When the data link 1 is used (answer NO on the step S4), it is judged whether the data link 2 is used or not (STEP S40).

If the data link 2 is not used, the switch contact points N-i, M-i, M-3 and L1-3 of the data link connecting section 1 are set on the connecting table (STEP S41: the connecting structure of FIG. 8, corresponding to the embodiment shown in FIG. 8).

When the data link 2 is used, the switch contact points N-i, M-1 through M-3, L1-3 and L2-3 of the data link connecting section 1 are set to the connecting table (STEP S42: the connecting structure of the B station 32 shown in FIG. 15, corresponding to the embodiment shown in FIG. 13).

On the step S4, when the data link 1 is not used (selected YES on the step S4), it is further judged whether the data link 2 is used or not. It becomes other connection, in the case where the data link 2 is used and the switch contact points N-1 and M-3 of the data link connecting section 1 are set on the connecting table, in the case where the data link 2 is not used (STEP S6: the connecting structure shown in FIG. 5, corresponding to the embodiment shown in FIG. 3). And after setting it on the connecting table, it is set on the data link connecting section 1.

Returning to the step S2 shown in FIG. 20, when the NE type 20 is judged as Ring on the step S2, it is judged whether the monitoring control classification 22 is classified as the E2A or not. If it is YES, the switch contact points N-1, M-1 through M-3, L1-3 and L2-3 are connected to the connecting table (STEP S21: the connecting structure of the A station 31 shown in FIG. 18, corresponding to the embodiment shown in FIG. 1).

When the monitoring control classification 22 is not classified as the E2A, that is, GP1 or GP2, the switch contact points N-2, N-3, L1-2 and L2-2 are set on the connecting table (STEP S22: the connecting structure of the B or C station shown in FIG. 19, corresponding to the embodiment shown in FIG. 16).

And returning to the flow shown in FIG. 20, the connecting table is set on the data link connecting section 1 (STEP S7).

Further, when the monitoring control classification 22 is not classified as E2A on the step S3 shown in FIG. 20, it is judged whether the monitoring control classification 22 is classified as GP1 or not on the flow shown in FIG. 21 (STEP S30). If it is not classified as GP1, it becomes other connection. When it is judged as GP1, it is judged whether the data link 1 is used or not (STEP S31).

In this case, if it is judged whether the data link 1 is not used, the appropriate connecting pattern does not exist. If it is judged whether the data link 1 is used, it is judged whether the data link 2 is used or not (STEP S32).

Hereupon, if the data link 2 is not used, the switch contact pointes N-2 and L1-2 are set on the connecting table (STEP S33: the connecting structure of the B station shown in FIG. 9, corresponding to the embodiment shown in FIG. 6).

Further, if the data link 2 is used, the switch contact points N-2, L1-2 and L2-1 are connected to the connecting table (STEP S34: the connecting structure of the B station 32 shown in FIG. 12, corresponding to the embodiment shown in FIG. 10). And the connecting table is set on the data link connecting section 1, eventually, and the steps are finished (STEP S7).

As described above according to the embodiments, it becomes possible to prevent miss operation by the operation from the maintenance console which can be used easily by the users, and further improve reliability. Further, in the prior art, although the setting switches could not be changed, when the users go to each of transmission device, it becomes possible to operate from the maintenance console, even if it is on the remote location, and change the setting of the data link connection, according to the operation from one maintenance center, easily.

Furthermore, it becomes possible to control for monitoring the maintenance according to the various kinds of new networks required by the users.

What is claimed is:

1. A data link control system provided in each of a plurality of transmission devices constituting a network, for use in constructing data links to monitor and control the transmission devices from a maintenance device, the data link control system comprising:

a first interface section connected to the maintenance device for interfacing a signal from and to the maintenance device;

a second interface section connected to the transmission devices via transmission lines; and a data link connecting section having a first interface circuit connected to the first interface section for interfacing a signal from and to the first interface section, a second interface circuit connected to the second interface section for interfacing a signal from and to each of the transmission line, and connection paths which are formed to make data link connection between the first and second interface circuits according to information about the data link connection, wherein the second interface section is connected to a first transmission device via a first transmission line and to a second transmission device via a second transmission line, and the second interface circuit includes a first interface portion which interfaces a signal from and to the first transmission line and a second interface portion which interfaces a signal from and to the second transmission line via the second interface section.

2. The data link control system according to claim 1, wherein the connection paths are formed to make data link connection between the first and second interface portions of the second interface circuit according to information about the data link connection.

3. The data link control system according to claim 1, wherein the information about the data link connection has items indicating a type of a transmission device, station address, monitoring control classification, information indicating whether or not a first data link for the first interface portion of the second interface circuit is used, and information indicating whether or not a second data link for the second interface portion of the second interface circuit is used.

4. The data link control system according to claim 1, further comprising a monitoring control section connected to the data link connecting section for monitoring faults of the transmission lines and the transmission devices, wherein the data link connecting section has a third interface circuit for interfacing a signal from and to the monitoring control section, and the connection paths are formed to make data link connection of the third interface circuit with the first interface circuit or the second interface circuit or both the first interface circuit and the second interface circuit.

5. The data Link control system according to claim 4, wherein:

the first and third interface circuits and the first and second interface portions of the second interface circuit are formed by first to fourth OR gate circuits, respectively, the first to fourth OR gate circuits respectively have three inputs, and are connected to first to fourth switch groups of switch contact points, respectively, first inputs from the monitoring control section and the first and second interface portions are connected to the switch contact points of the first switch group of the first OR gate circuit, second inputs from the first interface section, and the second interface section are connected to the switch contact points of the fourth switch group of the fourth OR gate circuit, third inputs from the first interface section, the monitoring control section and the second interface portion of the second interface circuit are connected to the switch contact points of the third switch group of the third OR gate circuit, and fourth inputs from the first interface section, the monitoring control section and the first interface portion of the second interface circuit are connected to the switch contact points of the second switch group of the second OR gate circuit.

6. The data link control system according to claim 5, wherein the first to the fourth switch groups have first to third switches, respectively.

7. The data link control system according to claim 6, wherein the network is constituted by connecting one transmission device to the maintenance device, and the switch contact points of the third switch of the first switch group and the first switch of the fourth switch group are connected for leading a signal inputted from the monitoring control section to the first interface section via the first OR gate circuit, and a signal inputted from the first interface section to the monitoring control section via the fourth OR gate circuit.

8. The data link control system according to claim 6, wherein:

the network is constituted by connecting two transmission devices to the maintenance device via a transmission line with a point-to-point structure, the switch contact points of the first and third switches of the first switch group, the first switch of the fourth switch group and the third switch of the second switch group of the data link connecting section are connected to obtain a data link directly between a first transmission device and the maintenance device, signals inputted from the monitoring control section and the first interface portion of the second interface section are inputted to the first interface section, via the first OR gate circuit, a signal inputted from the first interface section is inputted to the monitoring control section, via the fourth OR gate circuit, and a signal inputted from the first interface section is inputted to the first interface portion of the second interface section via the second OR gate circuit.

9. The data link control system according to claim 8, wherein:

the switch contact points of the second switch of the fourth switch group and the second switch of the second switch group of the data link connecting section are connected to obtain a data link between the first transmission device and the second transmission device connected to the first transmission device via a transmission line with the point-to-point structure, a signal inputted from the first interface portion of the second interface section is inputted to the monitoring control section, via the fourth OR gate circuit, and a signal inputted from the monitoring control section is inputted to the second interface section via the third OR gate circuit.

10. The data link control system according to claim 6, wherein:

the network is constituted with a liner structure, by connecting more than three transmission devices to the maintenance device via optical transmission lines, the switch contact points of the first and third switches of the first switch group, the first switch of the fourth switch group and the third switch of the second switch group of the data link connecting section are connected to obtain a data link directly between one transmission device and the maintenance device, signals from the monitoring control section and the first interface portion of the second interface section are inputted to the first interface section via the first OR gate circuit, a signal from the first interface section is inputted to the monitoring control section via the fourth OR gate circuit, and a signal from the first interface section is inputted to the first interface portion of the second interface section via the second OR gate circuit.

11. The data link control system according to claim 10, wherein:

the switch contact points of the second switch of the fourth switch group, the first and second switches of the second switch group and the first switch of the third switch group of the data link connecting section are connected for constituting the data link for the transmission device, which repeats a preceding transmission device and a succeeding transmission device via the transmission lines, a signal from the first interface portion of the second interface section is inputted to the monitoring control section via the fourth OR gate circuit, and the signal is inputted to the second interface portion of the second interface section via the third OR gate circuit, and a signal from the monitoring control section is inputted to the first interface portion of the second interface section via the second OR gate circuit.

12. The data link control system according to claim 6, wherein:

the network is constituted by connecting the plurality of the transmission devices with a linear structure, and connecting the maintenance device to one transmission device, which is located in the middle of the plurality of transmission devices, the switch contact points of the first to third switches of the first switch group and the first switch of the fourth switch group, the third switch of the second switch group and the third switch of the third switch group of the data link connecting section are connected to obtain a data link directly between one transmission device located in the middle of the plurality of transmission devices and the maintenance device, a signal from the first interface portion of the second interface section and the second interface portion of the second interface section is inputted to the first interface section via the first OR gate circuit, and a signal from the first interface section is inputted to the monitoring control section via the fourth OR gate circuit, and the signal is inputted to the first and second interface portions of the second interface section via the second and third OR gate circuits.

13. The data link control system according to claim 6, wherein:

the network is constituted by connecting the plurality of transmission devices with a ring structure, and connecting the maintenance device to one transmission device selected from the plurality of transmission devices, the switch contact points of the first to third switches of the first switch group, the first switch of the fourth switch group, the third switch of the second switch group and the third switch of the second switch group and the third switch of the third switch group of the data link connecting section are connected to obtain a data link directly between the one transmission device and the maintenance device, signals from the first and second interface portions of the second interface section are inputted to the first interface section, via the first OR gate circuit, and a signal from the first interface section is inputted to the monitoring control section via the fourth OR gate circuit and the signal is inputted to the first and second interface portions of the second interface section via the second and third OR gate circuits.

14. The data link control system according to claim 13, wherein:

the switch contact points of the second and third switches of the fourth switch group, the second switch of the second switch group and the second switch of the third switch group of the data link connecting section are connected to obtain a data link directly between other transmission devices than the one transmission device connected to the maintenance device, signals from the first and second interface portions of the second interface section are inputted to the monitoring control section via the fourth OR gate circuit, and a signal from the monitoring control section is inputted to the first and second interface portions of the second interface section via the second and third OR gate circuits.

* * * * *